United States Patent
Edmondson et al.

(10) Patent No.: US 8,656,093 B1
(45) Date of Patent: *Feb. 18, 2014

(54) SUPPORTING LATE DRAM BANK HITS

(75) Inventors: John H. Edmondson, Arlington, MA (US); Shane Keil, Santa Clara, CA (US)

(73) Assignee: NVIDIA Corporation, Santa Clara, CA (US)

( * ) Notice: Subject to any disclaimer, the term of this patent is extended or adjusted under 35 U.S.C. 154(b) by 646 days.

This patent is subject to a terminal disclaimer.

(21) Appl. No.: 12/326,063

(22) Filed: Dec. 1, 2008

(51) Int. Cl.
*G06F 12/00* (2006.01)
*G06F 13/00* (2006.01)
*G06F 13/28* (2006.01)

(52) U.S. Cl.
USPC .......................................................... 711/105

(58) Field of Classification Search
USPC .......................................................... 711/105
See application file for complete search history.

(56) References Cited

U.S. PATENT DOCUMENTS 6,470,433 B1 * 10/2002 Prouty et al. ................. 711/168
2006/0064535 A1    3/2006 Walker

OTHER PUBLICATIONS

Office Action, U.S. Appl. No. 12/326,060, dated Feb. 7, 2012.

* cited by examiner

*Primary Examiner* — Matthew Bradley
*Assistant Examiner* — Craig Goldschmidt
(74) *Attorney, Agent, or Firm* — Patterson + Sheridan, L.L.P.

(57) ABSTRACT

One embodiment of the invention sets forth a mechanism to transmit commands received from an L2 cache to a bank page within the DRAM. An arbiter unit determines which commands from a command sorter to transmit to a command queue. An activate command associated with the bank page related to the commands is also transmitted to an activate queue. The last command in the command queue is marked as "last." An interlock counter stores a count of "last" commands in the read/write command queue. A DRAM controller transmits activate and commands from the activate queue and the command queue to the DRAM. Each time a command marked as "last" is encountered, the DRAM controller decrements the interlock counter. If the count in the interlock counter is zero, then the command marked as "last" is marked as "auto-precharge." The "auto-precharge" command, when processed, causes the bank page to be closed.

18 Claims, 10 Drawing Sheets

SUPPORTING LATE DRAM BANK HITS

BACKGROUND OF THE INVENTION

1. Field of the Invention

The present invention relates generally to the field of memory management and, more specifically, to supporting late DRAM bank hits.

2. Description of the Related Art

One element of a memory subsystem within certain processing units is a Level 2 Cache memory (referred to herein as "L2 cache"). The L2 cache is a large on-chip memory that temporarily stores data being used by the various clients. This data may be retrieved from or written to an external memory (referred to herein as "DRAM"). A memory controller (referred to herein as "DRAM controller") manages the flow of data being transmitted to or retrieved from the DRAM.

A DRAM typically includes multiple DRAM banks, where each bank is divided into multiple bank pages. A bank page within a DRAM bank needs to be activated before data can be transmitted to or retrieved from that bank page. Only one bank page within a specific DRAM bank can be active at any given clock cycle. After the last data transmission to or data retrieval from a particular bank page is complete, a pre-charge command is transmitted to the DRAM bank, causing the bank page to be closed. Future data transmissions and data retrievals associated with that bank page require the re-activation of that particular bank page. As is well-known, activating and pre-charging bank pages within a DRAM bank are both extremely time consuming operations. Therefore, if either of these two operations is executed too frequently, the overall system performance may be severely impacted.

Conventional DRAM controllers wait a pre-determined number of clock cycles after the last read or write command has been processed by a particular bank page before transmitting a pre-charge command to the DRAM bank. The DRAM controllers implementing this scheme wait the pre-determined number of clock cycles to allow potential read and write commands that are associated with that bank page to be processed. This scheme often times forces a bank page to remain activated even when no new read or write commands are transmitted increasing, increasing the latency of the overall system Further, the DRAM controller transmits a separate command for each activate and pre-charge operation to the DRAM bank through a command bus. The same command bus is used to transmit read and write commands to the DRAM bank. Transmitting a command for each activate and pre-charge operation uses up the limited bandwidth on the command bus that may be used to transmit read and write commands, thereby causing command bus bandwidth inefficiencies.

As the foregoing illustrates, what is needed in the art is a more efficient mechanism for determining when to activate and pre-charge the different bank pages within a DRAM bank.

SUMMARY OF THE INVENTION

One embodiment of the present invention sets forth a method for processing commands associated with an activated bank page within a memory unit. The method includes the steps of selecting a first entry from a bank queue, extracting a first bank page number included in the first entry, transmitting a activate command to activate a first bank page within the memory unit identified by the first bank page number, requesting one or more commands from a first sort bin associated with the first entry; and transmitting the one or more commands to a command queue for processing relative to the first bank page.

One advantage of the disclosed method is that it causes a bank page to remain activated until there are no more read/write commands associated with that bank page stored in the command sorter. This approach maximizes the number of read/write commands that may be processed within a single activation window of a specific bank page.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

DETAILED DESCRIPTION

In the following description, numerous specific details are set forth to provide a more thorough understanding of the present invention. However, it will be apparent to one of skill in the art that the present invention may be practiced without one or more of these specific details. In other instances, well-known features have not been described in order to avoid obscuring the present invention.

System Overview

Figure 1:
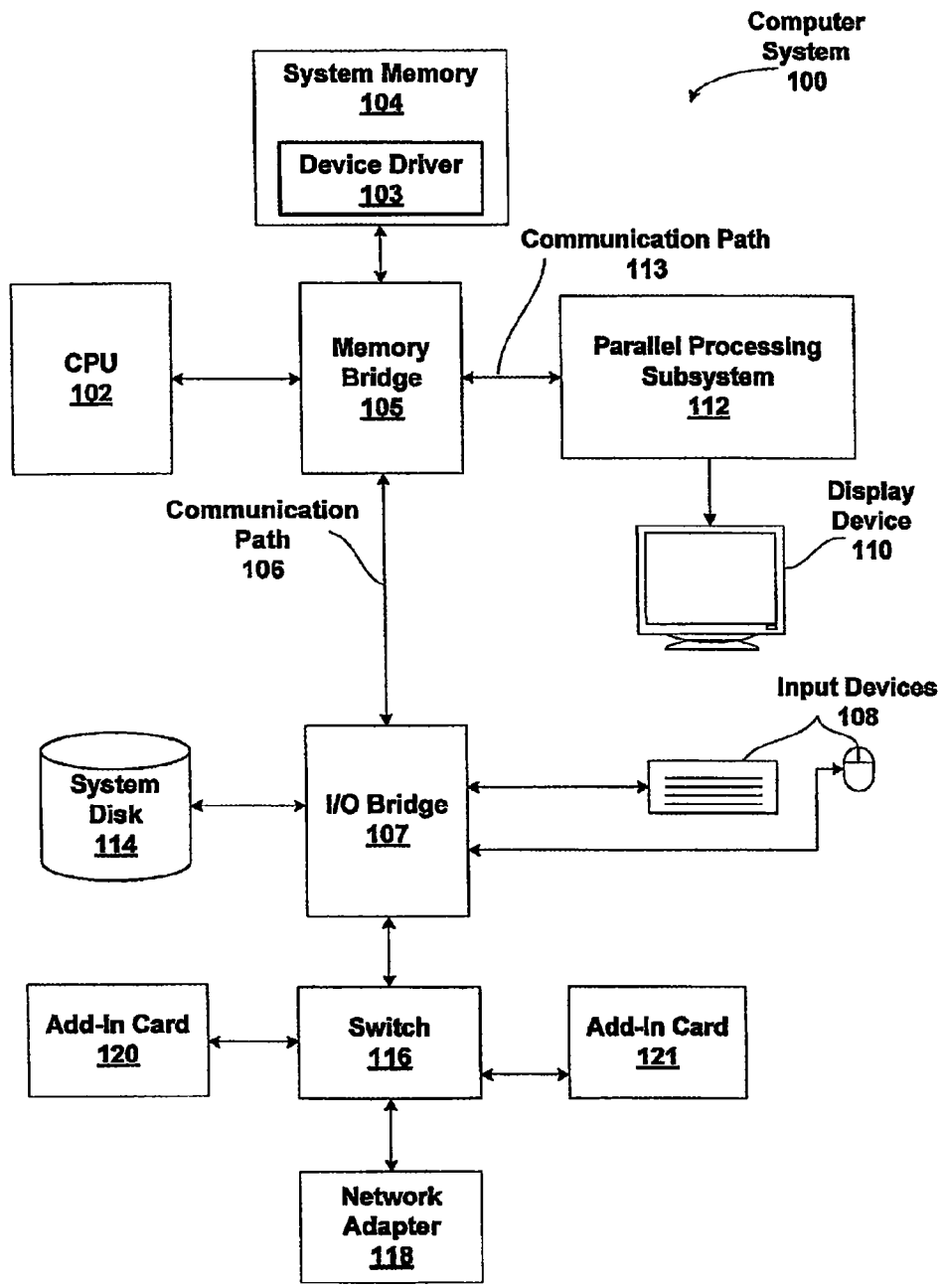
FIG. 1 is a block diagram illustrating a computer system configured to implement one or more aspects of the present invention.

FIG. 1 is a block diagram illustrating a computer system 100 configured to implement one or more aspects of the present invention. Computer system 100 includes a central processing unit (CPU) 102 and a system memory 104 communicating via a bus path through a memory bridge 105. Device driver 103 may be integrated into system memory 102 as shown in FIG. 1. Memory bridge 105 may be integrated into CPU 102 as shown in FIG. 1. Alternatively, memory bridge 105, may be a conventional device, e.g., a Northbridge chip, that is connected via a bus to CPU 102. Memory bridge 105 is connected via communication path 106 (e.g., a HyperTransport link) to an I/O (input/output) bridge 107. I/O bridge 107, which may be, e.g., a Southbridge chip, receives user input from one or more user input devices 108 (e.g., keyboard, mouse) and forwards the input to CPU 102 via path 106 and memory bridge 105. A parallel processing subsystem 112 is coupled to memory bridge 105 via a bus or other communication path 113 (e.g., a PCI Express, Accelerated Graphics Port, or HyperTransport link); in one embodiment parallel processing subsystem 112 is a graphics subsystem that delivers pixels to a display device 110 (e.g., a conventional CRT or LCD based monitor). A system disk 114 is also connected to I/O bridge 107. A switch 116 provides connections between I/O bridge 107 and other components such as a network adapter 118 and various add in cards 120 and 121. Other components (not explicitly shown), including USB or other port connections, CD drives, DVD drives, film recording devices, and the like, may also be connected to I/O bridge 107. Communication paths interconnecting the various components in FIG. 1 may be implemented using any suitable protocols, such as PCI (Peripheral Component Interconnect), PCI Express (PCI E), AGP (Accelerated Graphics Port), HyperTransport, or any other bus or point to point communication protocol(s), and connections between different devices may use different protocols as is known in the art.

In one embodiment, the parallel processing subsystem 112 incorporates circuitry optimized for graphics and video processing, including, for example, video output circuitry, and constitutes a graphics processing unit (GPU). In another embodiment, the parallel processing subsystem 112 incorporates circuitry optimized for general purpose processing, while preserving the underlying computational architecture, described in greater detail herein. In yet another embodiment, the parallel processing subsystem 112 may be integrated with one or more other system elements, such as the memory bridge 105, CPU 102, and I/O bridge 107 to form a system on chip (SoC).

It will be appreciated that the system shown herein is illustrative and that variations and modifications are possible. The connection topology, including the number and arrangement of bridges, may be modified as desired. For instance, in some embodiments, system memory 104 is connected to CPU 102 directly rather than through a bridge, and other devices communicate with system memory 104 via memory bridge 105 and CPU 102. In other alternative topologies, parallel processing subsystem 112 is connected to I/O bridge 107 or directly to CPU 102, rather than to memory bridge 105. In still other embodiments, one or more of CPU 102, I/O bridge 107, parallel processing subsystem 112, and memory bridge 105 may be integrated into one or more chips. The particular components shown herein are optional; for instance, any number of add-in cards or peripheral devices might be supported. In some embodiments, switch 116 is eliminated, and network adapter 118 and add-in cards 120, 121 connect directly to I/O bridge 107.

Figure 2:
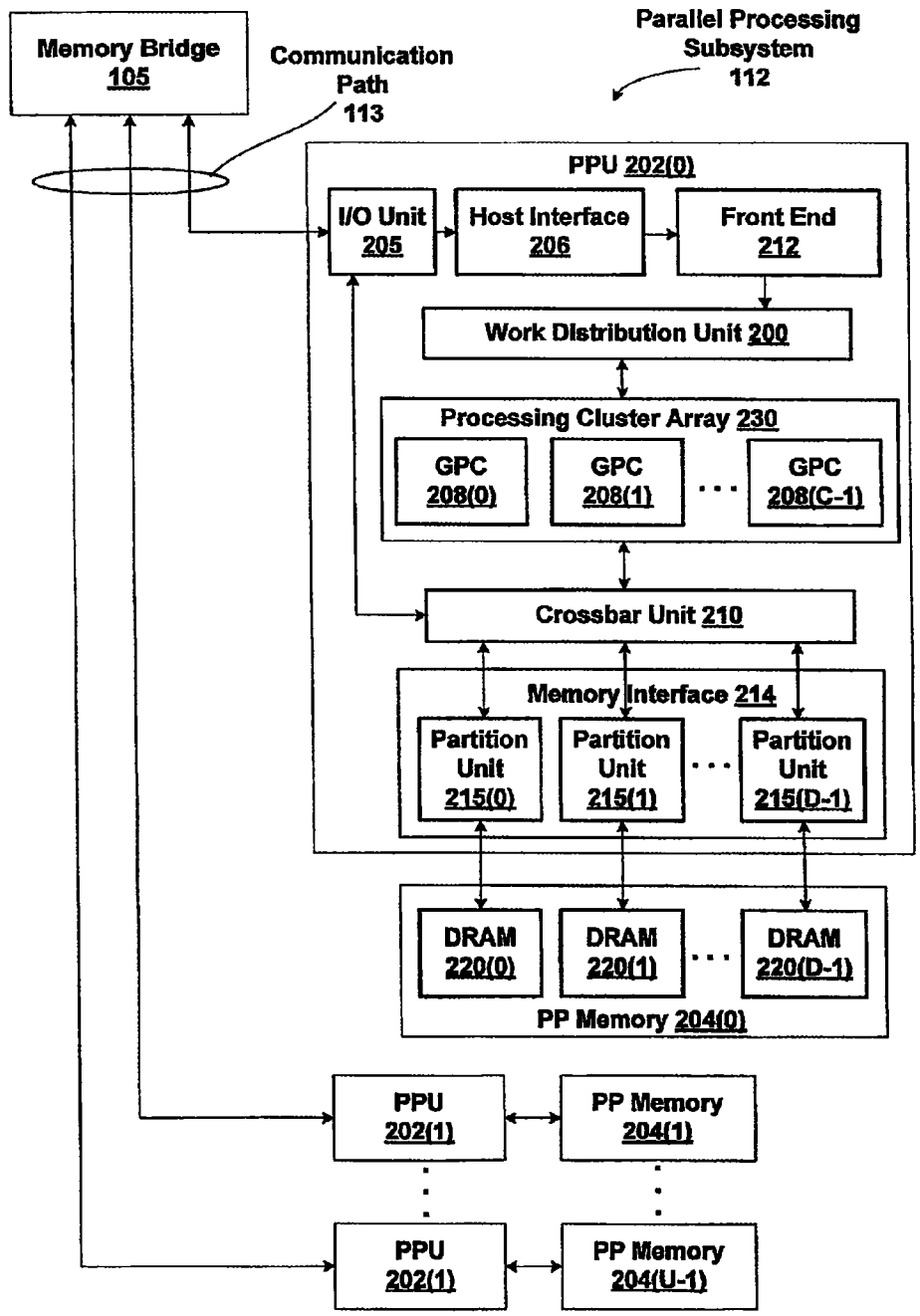
FIG. 2 is a block diagram of a parallel processing subsystem for the computer system of FIG. 1, according to one embodiment of the present invention.

FIG. 2 illustrates a parallel processing subsystem 112, according to one embodiment of the present invention. As shown, parallel processing subsystem 112 includes one or more parallel processing units (PPUs) 202, each of which is coupled to a local parallel processing (PP) memory 204. In general, a parallel processing subsystem includes a number U of PPUs, where U≥1. (Herein, multiple instances of like objects are denoted with reference numbers identifying the object and parenthetical numbers identifying the instance where needed.) PPUs 202 and parallel processing memories 204 may be implemented using one or more integrated circuit devices, such as programmable processors, application specific integrated circuits (ASICs), or memory devices, or in any other technically feasible fashion.

Referring again to FIG. 1, in some embodiments, some or all of PPUs 202 in parallel processing subsystem 112 are graphics processors with rendering pipelines that can be configured to perform various tasks related to generating pixel data from graphics data supplied by CPU 102 and/or system memory 104, interacting with local parallel processing memory 204 (which can be used as graphics memory including, e.g., a conventional frame buffer) to store and update pixel data, delivering pixel data to display device 110, and the like. In some embodiments, parallel processing subsystem 112 may include one or more PPUs 202 that operate as graphics processors and one or more other PPUs 202 that are used for general-purpose computations. The PPUs may be identical or different, and each PPU may have its own dedicated parallel processing memory device(s) or no dedicated parallel processing memory device(s). One or more PPUs 202 may output data to display device 110 or each PPU 202 may output data to one or more display devices 110.

In operation, CPU 102 is the master processor of computer system 100, controlling and coordinating operations of other system components. In particular, CPU 102 issues commands that control the operation of PPUs 202. In some embodiments, CPU 102 writes a stream of commands for each PPU 202 to a command buffer (not explicitly shown in either FIG. 1 or FIG. 2) that may be located in system memory 104, parallel processing memory 204, or another storage location accessible to both CPU 102 and PPU 202. PPU 202 reads the command stream from the command buffer and then executes commands asynchronously relative to the operation of CPU 102. CPU 102 may also create data buffers that PPUs 202 may read in response to commands in the command buffer. Each command and data buffer may be read by each of PPUs 202.

Referring back now to FIG. 2, each PPU 202 includes an I/O (input/output) unit 205 that communicates with the rest of computer system 100 via communication path 113, which connects to memory bridge 105 (or, in one alternative embodiment, directly to CPU 102). The connection of PPU 202 to the rest of computer system 100 may also be varied. In some embodiments, parallel processing subsystem 112 is implemented as an add-in card that can be inserted into an expansion slot of computer system 100. In other embodiments, a PPU 202 can be integrated on a single chip with a bus bridge, such as memory bridge 105 or I/O bridge 107. In still other embodiments, some or all elements of PPU 202 may be integrated on a single chip with CPU 102.

In one embodiment, communication path 113 is a PCI-E link, in which dedicated lanes are allocated to each PPU 202, as is known in the art. Other communication paths may also be used. An I/O unit 205 generates packets (or other signals) for transmission on communication path 113 and also receives all incoming packets (or other signals) from communication path 113, directing the incoming packets to appropriate components of PPU 202. For example, commands related to processing tasks may be directed to a host interface 206, while commands related to memory operations (e.g., reading from or writing to parallel processing memory 204) may be directed to a memory crossbar unit 210. Host interface 206 reads each command buffer and outputs the work specified by the command buffer to a front end 212.

Each PPU 202 advantageously implements a highly parallel processing architecture. As shown in detail, PPU 202(0) includes a processing cluster array 230 that includes a number C of general processing clusters (GPCs) 208, where C≥1. Each GPC 208 is capable of executing a large number (e.g., hundreds or thousands) of threads concurrently, where each thread is an instance of a program. In various applications, different GPCs 208 may be allocated for processing different types of programs or for performing different types of computations. For example, in a graphics application, a first set of GPCs 208 may be allocated to perform tessellation operations and to produce primitive topologies for patches, and a second set of GPCs 208 may be allocated to perform tessellation shading to evaluate patch parameters for the primitive topologies and to determine vertex positions and other per-vertex attributes. The allocation of GPCs 208 may vary depending on the workload arising for each type of program or computation. Alternatively, GPCs 208 may be allocated to perform processing tasks using time-slice scheme to switch between different processing tasks.

GPCs 208 receive processing tasks to be executed via a work distribution unit 200, which receives commands defining processing tasks from front end unit 212. Processing tasks include pointers to data to be processed, e.g., surface (patch) data, primitive data, vertex data, and/or pixel data, as well as state parameters and commands defining how the data is to be processed (e.g., what program is to be executed). Work distribution unit 200 may be configured to fetch the pointers corresponding to the processing tasks, may receive the pointers from front end 212, or may receive the data directly from front end 212. In some embodiments, indices specify the location of the data in an array. Front end 212 ensures that GPCs 208 are configured to a valid state before the processing specified by the command buffers is initiated.

When PPU 202 is used for graphics processing, for example, the processing workload for each patch is divided into approximately equal sized tasks to enable distribution of the tessellation processing to multiple GPCs 208. A work distribution unit 200 may be configured to output tasks at a frequency capable of providing tasks to multiple GPCs 208 for processing. In some embodiments of the present invention, portions of GPCs 208 are configured to perform different types of processing. For example a first portion may be configured to perform vertex shading and topology generation, a second portion may be configured to perform tessellation and geometry shading, and a third portion may be configured to perform pixel shading in screen space to produce a rendered image. The ability to allocate portions of GPCs 208 for performing different types of processing tasks efficiently accommodates any expansion and contraction of data produced by those different types of processing tasks. Intermediate data produced by GPCs 208 may buffered to allow the intermediate data to be transmitted between GPCs 208 with minimal stalling in cases where the rate at which data is accepted by a downstream GPC 208 lags the rate at which data is produced by an upstream GPC 208.

Memory interface 214 may be partitioned into a number D of memory partition units that are each coupled to a portion of parallel processing memory 204, where D≥1. Each portion of parallel processing memory 204 generally includes one or more memory devices (e.g DRAM 220). Persons skilled in the art will appreciate that DRAM 220 may be replaced with other suitable storage devices and can be of generally conventional design. A detailed description is therefore omitted. Render targets, such as frame buffers or texture maps may be stored across DRAMs 220, allowing partition units 215 to write portions of each render target in parallel to efficiently use the available bandwidth of parallel processing memory 204.

Any one of GPCs 208 may process data to be written to any of the partition units 215 within parallel processing memory 204. Crossbar unit 210 is configured to route the output of each GPC 208, otherwise referred to herein as a "client," to the input of any partition unit 214 or to another GPC 208 for further processing. GPCs 208 communicate with memory interface 214 through crossbar unit 210 to read from or write to various external memory devices. In one embodiment, crossbar unit 210 has a connection to memory interface 214 to communicate with I/O unit 205, as well as a connection to local parallel processing memory 204, thereby enabling the processing cores within the different GPCs 208 to communicate with system memory 104 or other memory that is not local to PPU 202. Crossbar unit 210 may use virtual channels to separate traffic streams between the GPCs 208 and partition units 215.

Again, GPCs 208 can be programmed to execute processing tasks relating to a wide variety of applications, including but not limited to, linear and nonlinear data transforms, filtering of video and/or audio data, modeling operations (e.g., applying laws of physics to determine position, velocity and other attributes of objects), image rendering operations (e.g., tessellation shader, vertex shader, geometry shader, and/or pixel shader programs), and so on. PPUs 202 may transfer data from system memory 104 and/or local parallel processing memories 204 into internal (on-chip) memory, process the data, and write result data back to system memory 104 and/or local parallel processing memories 204, where such data can be accessed by other system components, including CPU 102 or another parallel processing subsystem 112.

A PPU 202 may be provided with any amount of local parallel processing memory 204, including no local memory, and may use local memory and system memory in any combination. For instance, a PPU 202 can be a graphics processor in a unified memory architecture (UMA) embodiment. In such embodiments, little or no dedicated graphics (parallel processing) memory would be provided, and PPU 202 would use system memory exclusively or almost exclusively. In UMA embodiments, a PPU 202 may be integrated into a bridge chip or processor chip or provided as a discrete chip with a high-speed link (e.g., PCI-E) connecting the PPU 202 to system memory via a bridge chip or other communication means.

As noted above, any number of PPUs 202 can be included in a parallel processing subsystem 112. For instance, multiple PPUs 202 can be provided on a single add-in card, or multiple add-in cards can be connected to communication path 113, or one or more PPUs 202 can be integrated into a bridge chip. PPUs 202 in a multi-PPU system may be identical to or different from one another. For instance, different PPUs 202 might have different numbers of processing cores, different amounts of local parallel processing memory, and so on. Where multiple PPUs 202 are present, those PPUs may be operated in parallel to process data at a higher throughput than is possible with a single PPU 202. Systems incorporating one or more PPUs 202 may be implemented in a variety of configurations and form factors, including desktop, laptop, or handheld personal computers, servers, workstations, game consoles, embedded systems, and the like.

Processing Cluster Array Overview

Figure 3A:
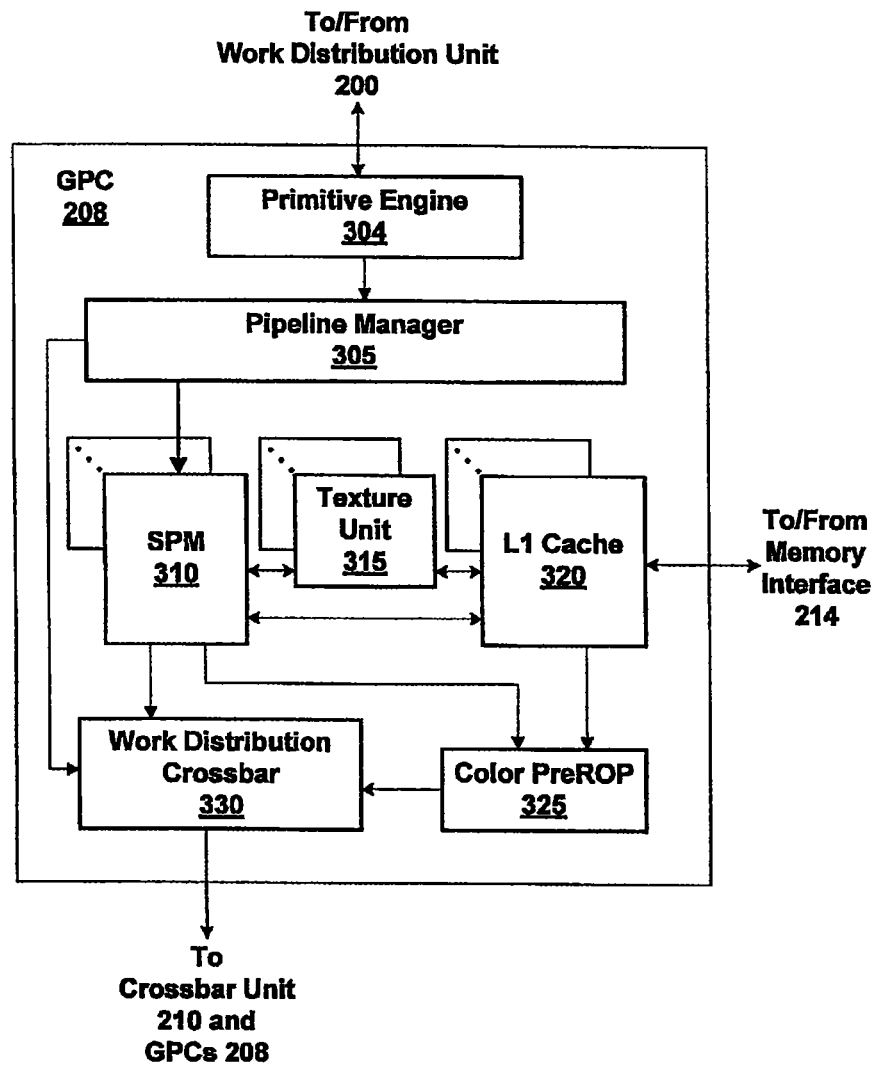
FIG. 3A is a block diagram of a GPC within one of the PPUs of FIG. 2, according to one embodiment of the present invention.

FIG. 3A is a block diagram of a GPC 208 within one of the PPUs 202 of FIG. 2, according to one embodiment of the present invention. Each GPC 208 may be configured to execute a large number of threads in parallel, where the term "thread" refers to an instance of a particular program executing on a particular set of input data. In some embodiments, single-instruction, multiple-data (SIMD) instruction issue techniques are used to support parallel execution of a large number of threads without providing multiple independent instruction units. In other embodiments, single-instruction, multiple-thread (SIMT) techniques are used to support parallel execution of a large number of generally synchronized threads, using a common instruction unit configured to issue instructions to a set of processing engines within each one of the GPCs 208. Unlike a SIMD execution regime, where all processing engines typically execute identical instructions, SIMT execution allows different threads to more readily follow divergent execution paths through a given thread program. Persons skilled in the art will understand that a SIMD processing regime represents a functional subset of a SIMT processing regime.

In graphics applications, a GPU 208 may be configured to implement a primitive engine for performing screen space graphics processing functions that may include, but are not limited to primitive setup, rasterization, and z culling. The primitive engine receives a processing task from work distribution unit 200, and when the processing task does not require the operations performed by primitive engine, the processing task is passed through the primitive engine to a pipeline manager 305. Operation of GPC 208 is advantageously controlled via a pipeline manager 305 that distributes processing tasks to streaming multiprocessors (SPMs) 310. Pipeline manager 305 may also be configured to control a work distribution crossbar 330 by specifying destinations for processed data output by SPMs 310.

In one embodiment, each GPC 208 includes a number M of SPMs 310, where M≥1, each SPM 310 configured to process one or more thread groups. Also, each SPM 310 advantageously includes an identical set of functional units (e.g., arithmetic logic units, etc.) that may be pipelined, allowing a new instruction to be issued before a previous instruction has finished, as is known in the art. Any combination of functional units may be provided. In one embodiment, the functional units support a variety of operations including integer and floating point arithmetic (e.g., addition and multiplication), comparison operations, Boolean operations (AND, OR, XOR), bit-shifting, and computation of various algebraic functions (e.g., planar interpolation, trigonometric, exponential, and logarithmic functions, etc.); and the same functional-unit hardware can be leveraged to perform different operations.

The series of instructions transmitted to a particular GPC 208 constitutes a thread, as previously defined herein, and the collection of a certain number of concurrently executing threads across the parallel processing engines (not shown) within an SPM 310 is referred to herein as a "thread group." As used herein, a "thread group" refers to a group of threads concurrently executing the same program on different input data, with each thread of the group being assigned to a different processing engine within an SPM 310. A thread group may include fewer threads than the number of processing engines within the SPM 310, in which case some processing engines will be idle during cycles when that thread group is being processed. A thread group may also include more threads than the number of processing engines within the SPM 310, in which case processing will take place over multiple clock cycles. Since each SPM 310 can support up to G thread groups concurrently, it follows that up to G×M thread groups can be executing in GPC 208 at any given time.

An exclusive local address space is available to each thread, and a shared per-CTA address space is used to pass data between threads within a CTA. Data stored in the per-thread local address space and per-CTA address space is stored in L1 cache 320, and an eviction policy may be used to favor keeping the data in L1 cache 320. Each SPM 310 uses space in a corresponding L1 cache 320 that is used to perform load and store operations. Each SPM 310 also has access to L2 caches within the partition units 215 that are shared among all GPCs 208 and may be used to transfer data between threads. Finally, SPMs 310 also have access to off-chip "global" memory, which can include, e.g., parallel processing memory 204 and/or system memory 104. An L2 cache may be used to store data that is written to and read from global memory. It is to be understood that any memory external to PPU 202 may be used as global memory.

In graphics applications, a GPC 208 may be configured such that each SPM 310 is coupled to a texture unit 315 for performing texture mapping operations, e.g., determining texture sample positions, reading texture data, and filtering the texture data. Texture data is read via memory interface 214 and is fetched from an L2 cache, parallel processing memory 204, or system memory 104, as needed. Texture unit 315 may be configured to store the texture data in an internal cache. In some embodiments, texture unit 315 is coupled to L1 cache 320, and texture data is stored in L1 cache 320. Each SPM 310 outputs processed tasks to work distribution crossbar 330 in order to provide the processed task to another GPC 208 for further processing or to store the processed task in an L2 cache, parallel processing memory 204, or system memory 104 via crossbar unit 210. A preROP (pre-raster operations) 325 is configured to receive data from SPM 310, direct data to ROP units within partition units 215, and perform optimizations for color blending, organize pixel color data, and perform address translations.

It will be appreciated that the core architecture described herein is illustrative and that variations and modifications are possible. Any number of processing engines, e.g., primitive engines 304, SPMs 310, texture units 315, or preROPs 325 may be included within a GPC 208. Further, while only one GPC 208 is shown, a PPU 202 may include any number of GPCs 208 that are advantageously functionally similar to one another so that execution behavior does not depend on which GPC 208 receives a particular processing task. Further, each GPC 208 advantageously operates independently of other GPCs 208 using separate and distinct processing engines, L1 caches 320, and so on.

Figure 3B:
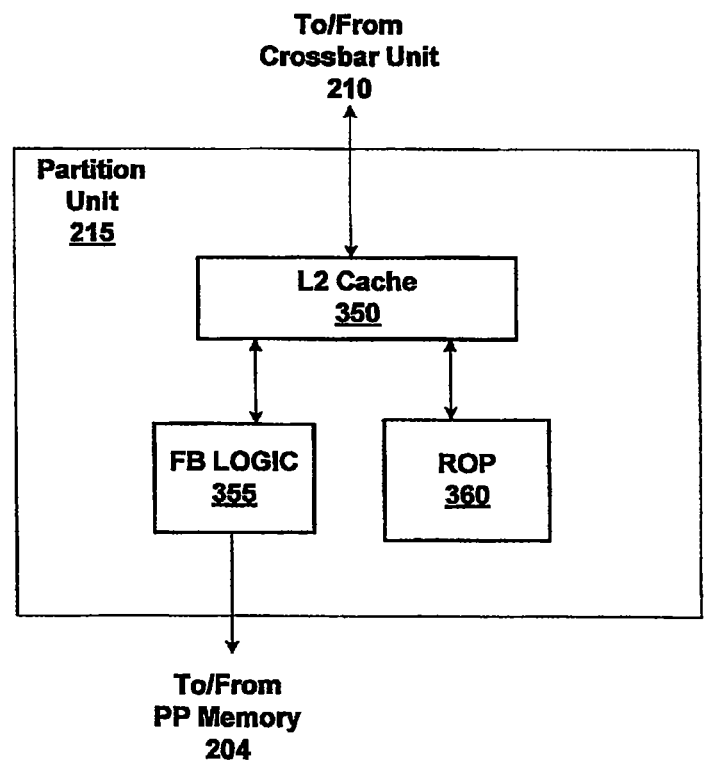
FIG. 3B is a block diagram of a partition unit within one of the PPUs of FIG. 2, according to one embodiment of the present invention.

FIG. 3B is a block diagram of a partition unit 215 within on of the PPUs 202 of FIG. 2, according to one embodiment of the present invention. As shown, partition unit 215 includes a L2 cache 350, a frame buffer (FB) 355, and a raster operations unit (ROP) 360. L2 cache 350 is a read/write cache that is configured to perform load and store operations received from crossbar unit 210 and ROP 360. Read misses and urgent writeback requests are output by L2 cache 350 to frame buffer logic 355 for processing. Dirty updates are also sent to frame buffer logic 355 for opportunistic processing. frame buffer logic 355 interfaces directly with parallel processing memory 204, outputting read and write requests and receiving data read from parallel processing memory 204.

In graphics applications, ROP 360 is a processing unit that performs raster operations, such as stencil, z test, blending, and the like, and outputs pixel data as processed graphics data for storage in graphics memory. In some embodiments of the present invention, ROP 360 is included within each GPC 208 instead of partition unit 215, and pixel read and write requests are transmitted over crossbar unit 210 instead of pixel fragment data.

The processed graphics data may be displayed on display device 110 or routed for further processing by CPU 102 or by one of the processing entities within parallel processing subsystem 112. Each partition unit 215 includes a ROP 360 in order to distribute processing of the raster operations. In some embodiments, ROP 360 may be configured to compress z or color data that is written to memory and decompress z or color data that is read from memory.

Persons skilled in the art will understand that the architecture described in FIGS. 1, 2, 3A and 3B in no way limits the scope of the present invention and that the techniques taught herein may be implemented on any properly configured processing unit, including, without limitation, one or more CPUs, one or more multi-core CPUs, one or more PPUs 202, one or more GPCs 208, one or more graphics or special purpose processing units, or the like, without departing the scope of the present invention.

Queuing Read/Write Requests to DRAM

Figure 4A:
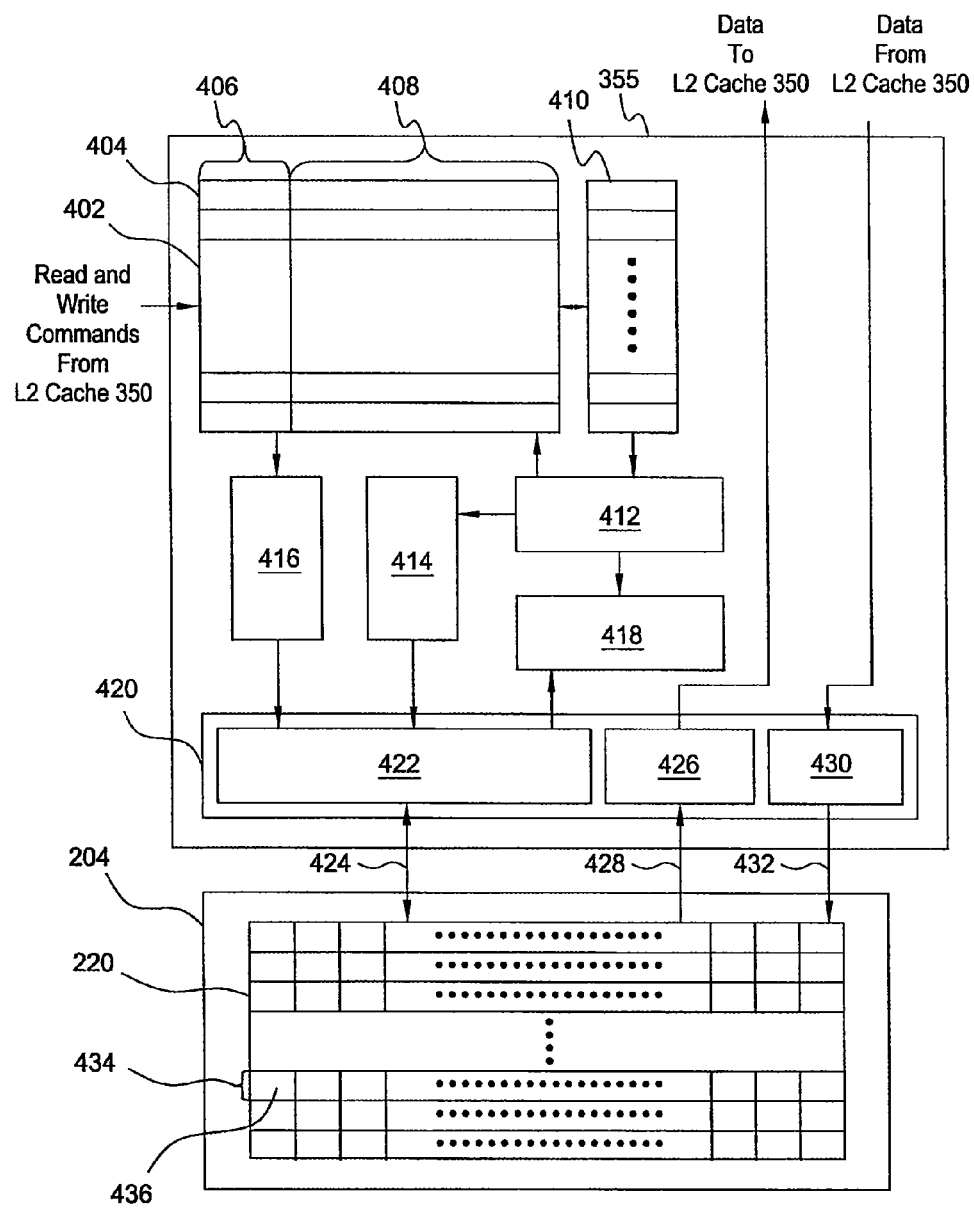
FIG. 4A is a detailed block diagram of the frame buffer logic of FIG. 3B and the DRAM of FIG. 2, according to one embodiment of the present invention.

FIG. 4 is a detailed block diagram of the frame buffer logic 355 of FIG. 3B and the DRAM 220 of FIG. 2, according to one embodiment of the present invention. As shown, the frame buffer logic 355 includes a command sorter 402, a bank queue 410, an arbiter unit 412, an activate command queue 414, a read/write command queue 416, an interlock counter 418 and a DRAM controller 420. As also shown, the DRAM 220 includes multiple bank pages, such as bank page 434, where each bank page includes multiple data blocks, such as data block 436 of bank page 434.

In operation, the frame buffer logic 355 receives read and write commands from the L2 cache 350. The read and write commands include the memory address of the location in the DRAM 220 from where the data associated with the command is retrieved from, in the case of a read command, or to where the data associated with the command is stored, in the case of a write command. Data associated with a particular read or write command is stored in a specific data block within a given bank page, such as data block 436 of the bank page 434. The memory address included in the read and write command specifies a bank page number that identifies the given bank page and an offset that identifies the specific data block within that bank page.

The frame buffer logic 355 implements the command sorter 402, which is a data structure that is configured to sort the read and write commands received from the L2 cache 350. The command sorter 402 is divided into multiple sort bins, such as the sort bin 404, where each sort bin may be affirmatively associated with a different bank page within the DRAM 220. Each sort bin in the command sorter 402 includes a bank page number portion 406 and a commands portion 408. The bank page number portion 406 in a sort bin stores the bank page number corresponding to the bank page affirmatively associated with that sort bin. The commands portion 408 in a sort bin stores the read and write commands associated with that sort bin.

When a new read or write command is received by the frame buffer logic 355, the frame buffer logic 355 extracts the bank page number included in the memory address corresponding to the read or write command. The frame buffer logic 355 then attempts to match the extracted bank page number with the bank page number portion 406 included in each of the affirmatively associated sort bins in the command sorter 402. If a match is found, then the frame buffer logic 355 stores the read or write command in the commands portion 408 of that affirmatively associated sort bin. If a match is not found, then the frame buffer logic 355 affirmatively associates an available sort bin in the command sorter 402 with the bank page associated with the extracted bank page number.

The sort bin is affirmatively associated by storing the extracted bank page number in the bank page number portion 406 of that sort bin. The frame buffer logic 355 also stores the read or write command in the commands portion 408 of the newly affirmatively associated sort bin.

The bank queue 410 is configured to store the bank page numbers corresponding to the different bank pages that are affirmatively associated with the sort bins in the command sorter 402. In one embodiment, the bank queue 410 is ordered based on the number of read and write commands stored in each of the different sort bins in the command sorter 402 affirmatively associated with one of the bank pages in the DRAM 220. Each time a sort bin within the command sorter 402 is updated with a new read or write command, the bank queue 410 is reordered to reflect the change in the number of read and write commands associated with each bank page in the DRAM 220. In this embodiment, the bank page number related to the sort bin in the command sorter 402 having the greatest number of read and write commands is positioned at the top of the bank queue 410. In another embodiment, the bank queue 410 is ordered based on the latency requirements of the read and write commands stored in each of the different sort bins in the command sorter 402.

As is well-known, a bank page needs to be activated before data can be read from or written to that bank page. In a situation where no bank page is currently activated, the arbiter unit 412 is configured to select the bank page number positioned at top of the bank queue 410. The arbiter unit 412 is configured to request the read and write commands stored in the sort bin in the command sorter 402 related to the selected bank page number for transmission to the read/write command queue 416. Again, the related sort bin is the sort bin in the command sorter 402 affirmatively associated with the bank page corresponding to the selected bank page number.

The read/write command queue 416 is configured to store read and write commands received from the different sort bins in the command sorter 402. The read/write command queue 416 stores these commands in the order in which the commands are received from the command sorter 402. The arbiter unit 412 marks the last read or write command transmitted to the read/write command queue 416 from a particular sort bin as "last" and also increments the interlock counter 418. The interlock counter 418 keeps track of the number of "last" commands associated with a specific bank page stored in the read/write command queue 416. In addition to requesting read and write commands stored in the related sort bin, the arbiter unit 412 also transmits an activate command to the activate command queue 414 that includes the selected bank page number (i.e., the bank page number selected from the top of the bank queue 410). The arbiter unit 412 then stores the selected bank page number.

The DRAM controller 420 includes controller logic 422, a read data buffer 426 and a write data buffer 430. The controller logic 422 is coupled to the DRAM 220 via the command bus 424 and is configured to transmit read, write and activate commands to the DRAM 220 for processing. In a situation where a bank page is not currently activated, the controller logic 422 selects the first activate command stored in the activate command queue 414 and transmits the selected activate command to the DRAM 220. Again, the DRAM 220 processes the activate command by activating the bank page corresponding to the bank page number included in the activate command. The controller logic 422 then waits a predetermined number of clock cycles until the bank page is activated.

Once the bank page is activated, the read and write commands that are stored in the read/write command queue 416 are sequentially transmitted to the bank page, via the command bus 424, for processing. In the case of a read command, the data associated with the read command is retrieved from the data block within the bank page that is associated with the read command, via the data bus 428, and stored in the read data buffer 426. The data associated with the read command is transmitted from the read data buffer 426 to the L2 cache 350 at a later clock cycle. In the case of the write command, the data associated with the write command is already stored in the write data buffer 430 and is transmitted to the data block within the bank page that is associated with the write command, via the data bus 432.

In a situation where a bank page is currently activated, the arbiter unit 412 determines the count reflected by the interlock counter 418 at every clock cycle. If the count reflected by the interlock counter 418 is greater than zero, then the arbiter unit 412 searches the bank queue 410 to determine whether an entry in the bank queue 410 matches the bank page number stored within the arbiter unit 412. If such an entry exists, then the arbiter unit 412 requests the read and write commands stored in the sort bin in the command sorter 402 related to the bank page number for transmission to the read/write command queue 416. The arbiter unit 412 marks the last read or write command transmitted to the read/write command queue 416 from that sort bin as "last" and increments the interlock counter 418.

When transmitting a read or write command from the read/write command queue 416 to a currently activated bank page, the controller logic 422 determines whether the read or write command positioned at the top of the read/write command queue (referred to herein as the "current command") is marked as "last." If the current command is not marked as "last," then the controller logic 422 transmits the next read or write command in the read/write command queue 416, once the current command is processed. If, however, the current command is marked as "last," then the controller logic 422 decrements the count reflected by the interlock counter 418. If the count reflected by the interlock counter 418 is not equal to zero, then the controller logic 422 continues to sequentially transmit read or write commands from the read/write command queue 416 to the currently activated bank page for processing. However, if the count reflected by the interlock counter 418 is equal to zero, then the controller logic 422 marks the current read or write command as "auto-precharge." The DRAM 220 closes the currently activated bank page after the read or write command marked as "auto-precharge" is processed.

Figure 4B:
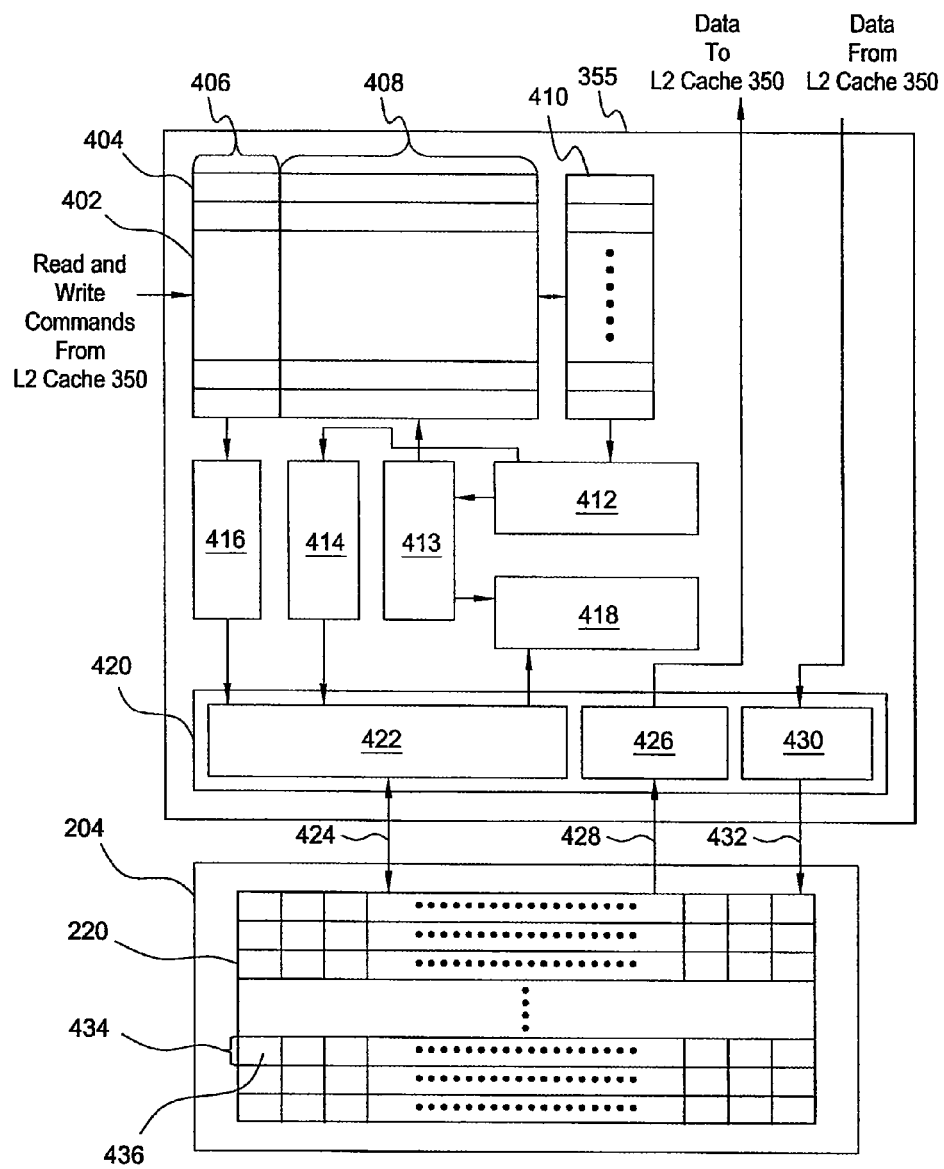
FIG. 4B is a detailed block diagram of the frame buffer logic of FIG. 3B and the DRAM of FIG. 2, according to another embodiment of the present invention.

FIG. 4B is a detailed block diagram of the frame buffer logic 355 of FIG. 3B and the DRAM 220 of FIG. 2, according to another embodiment of the present invention. In such an embodiment, the arbiter unit 412 is configured to select the bank page number positioned at the top of the bank queue 410 and transmit a corresponding activation command to the activate command queue 414. The arbiter unit 412 also transmits the selected bank page number to the command arbiter unit 413.

In a situation where no bank page is currently activated, indicated by the zero value count of the interlock counter 418, the command arbiter unit 413 is configured to request the read and write commands stored in the sort bin in the command sorter 402 related to the selected bank page number for transmission to the read/write command queue 416. The command arbiter unit 413 marks the last read or write command transmitted to the read/write command queue 416 from a particular sort bin as "last" and also increments the interlock counter 418. In a situation where a bank page is currently activated, the command arbiter unit 413 determines the count reflected by the interlock counter 418 at every clock cycle. If the count reflected by the interlock counter 418 is greater than zero, then the command arbiter unit 413 determines whether a sort bin in the command sorter 402 is related to the currently activated bank page. If such a sort bin exists, then the command arbiter unit 413 requests the read and write commands stored in that sort bin for transmission to the read/write command queue 416. The command arbiter unit 413 marks the last read or write command transmitted to the read/write command queue 416 from that sort bin as "last" and increments the interlock counter 418.

Figure 5A:
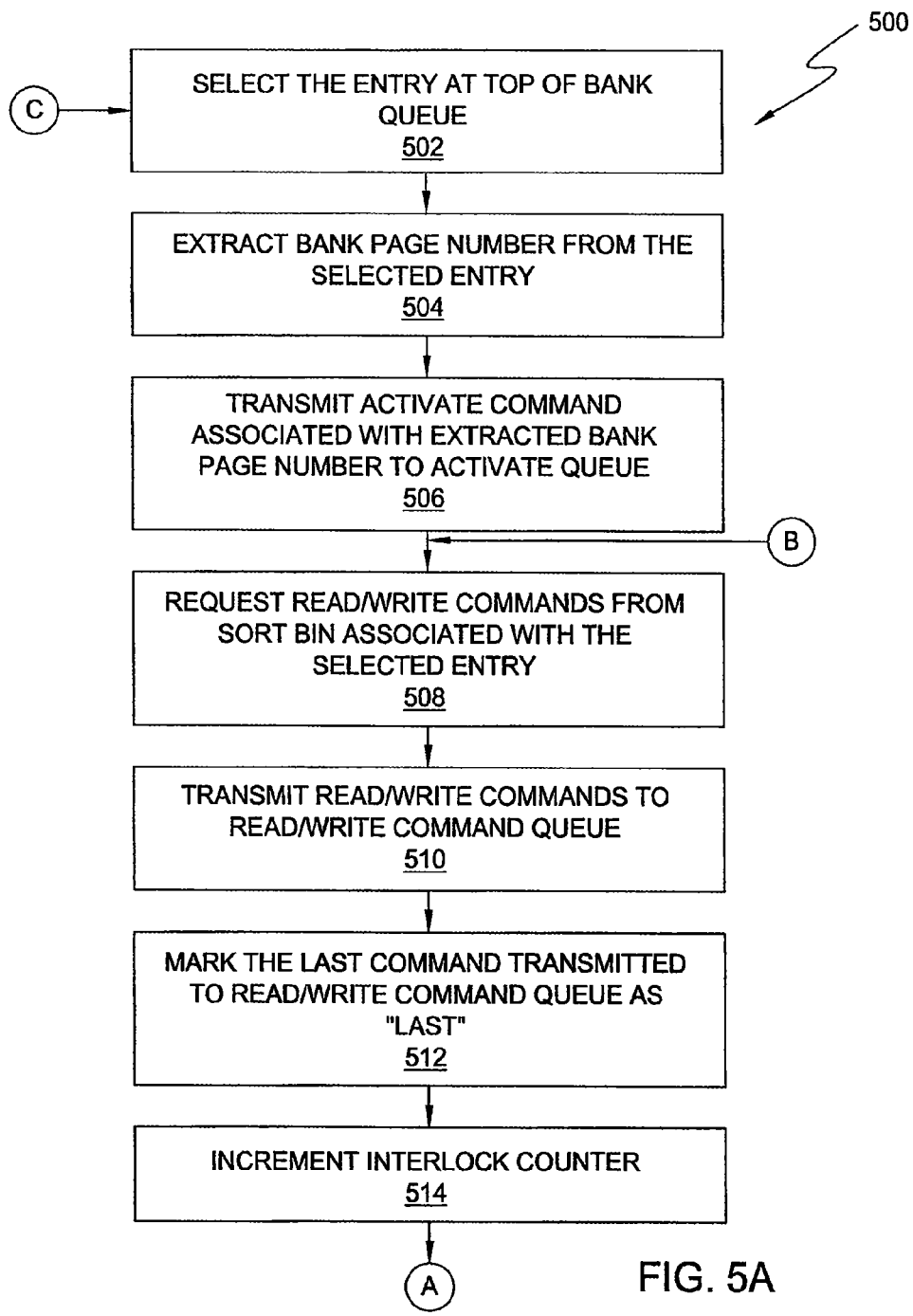
FIGS. 5A and 5B set forth a flow diagram of method steps for transmitting read and write commands from the command sorter of FIG. 4 to the read/write command queue of FIG. 4, according to one embodiment of the present invention.
Figure 5B:
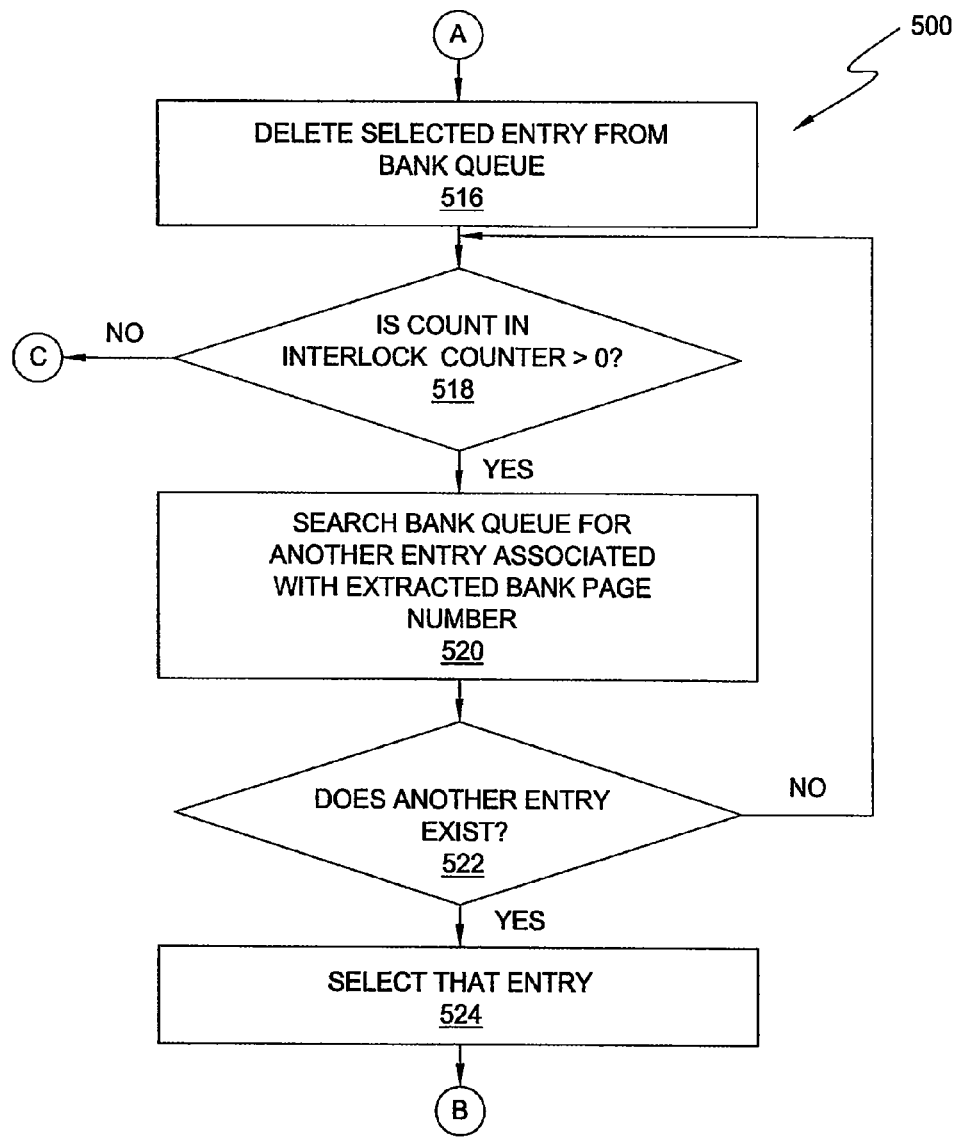

FIGS. 5A and 5B set forth a flow diagram of method steps for transmitting read and write commands from the command sorter 402 of FIG. 4 to the read/write command queue of FIG. 4, according to one embodiment of the present invention. Although the method steps are described in conjunction with the systems for FIGS. 1-4, persons skilled in the art will understand that any system configured to perform the method steps, in any order, is within the scope of the invention.

The method 500 begins at step 502 where the arbiter unit 412 selects the entry positioned at the top of the bank queue 410. As described in conjunction with FIG. 4, the bank queue 410 stores a queue of entries, where each entry includes the bank page number of a bank page in the DRAM 220 affirmatively associated with one of the sort bins in the command sorter 402. At step 504, the arbiter unit 412 extracts the bank page number from the entry selected at step 502. At step 506, the arbiter unit 412 transmits an activate command including the extracted bank page number to the activate command queue 414. The activate command is stored in the activate command queue 414 until the activate command is selected by the controller logic 422 and transmitted to the DRAM 220. Upon receiving an activate command, the DRAM 220 activates the bank page associated with the bank page number included in the activate command. Once the bank page is activated, the controller logic 422 may transmit read and write commands from the read/write command queue 416 to that bank page for further processing. The bank page associated with the bank page number extracted at step 504 is hereinafter referred to as the "currently activated bank page," although persons skilled in the art will recognize that, in certain situations, this bank page may not become activated for several clock cycles subsequent to when the arbiter unit 412 transmits the activate command to the activate command queue 414.

At step 508, the arbiter unit 412 requests the read and write commands (referred to herein as the "first set of read and write commands") stored in the sort bin in the command sorter 402 affirmatively associated with the bank page identified by the extracted bank page number (i.e., the currently activated bank page). At step 510, the arbiter unit 412 causes the first set of read and write commands to be transmitted to the read/write command queue 416 from the affirmatively associated sort bin. At step 512, the arbiter unit 412 then marks the last read or write command stored in that first set of read and write commands as "last." At step 514, the arbiter unit 412 increments the interlock counter 418 to indicate that a set of read and write commands has been received from a sort bin affirmatively associated with the currently activated bank page. As described in conjunction with FIG. 4, the interlock counter 418 keeps track of the number of "last" commands associated with the bank page identified by the extracted bank page number that are stored in the read/write command queue 416. At step 516, the selected entry is deleted from the bank queue 410.

If, at step 518, since the bank page identified by the bank page number extracted at step 504 is still activated, the arbiter unit 412 determines whether the count reflected by the interlock counter 418 is greater than zero. When the count reflected by the interlock counter 418 is greater than zero, the controller logic 422 has not finished processing the read and write commands associated with the currently activated bank page, signaling that the bank page identified by the bank page number extracted at step 504 is still activated. Again, since the bank page identified by the bank page number extracted at step 504 is still activated, the L2 cache 350 may transmit new read or write commands (referred to herein as the "new set of read and write commands") to the frame buffer logic 355 that are associated with this bank page. Thus, when the sort bin in the command sorter 402 affirmatively associated with the currently activated bank, as identified by the bank page number extracted from the bank queue entry at step 504, receives the new of read and write commands before the count of the interlock counter 418 is decremented to zero by the controller logic 422, that new set of read and write commands can be immediate processed. As described in conjunction with FIG. 4, in such a situation, the new set of read and write commands are received by the sort bin affirmatively associated with the currently activated bank page, and a corresponding entry is also created in the bank queue 410 that indicated the bank page number of the currently activated bank page—the same bank page number as that extracted at step 504.

If the count is greater than zero, then the method 500 proceeds to step 520, where the arbiter unit 412 searches the bank queue 410 for another entry that includes a bank page number that matches the bank page number extracted at step 504. At step 522, if such an entry exists, then the method 500 proceeds to step 524, where that entry is selected. The method 500 then returns to step 508, previously described herein, and the new set of read and write commands associated with the currently activated bank page are transmitted to the read/write command queue 416 for processing. At every clock cycle where the count reflected by the interlock counter 418 is greater than zero, the arbiter unit 412 loops in this fashion to determine whether an entry in the bank queue 410 associated with the bank page number extracted at step 504 exists. The existence of such an entry indicates that a new set of read and write commands has been received in the sort bin in the command sorter 402 affirmatively associated with the currently activated bank page. All such read and write commands may be processed until the count reflected by the interlock counter 418 equals zero, thereby substantially increasing the number of read and write commands that can be processed when a bank page is activated relative to prior art techniques.

If, at step 522, no entries exist having a bank page number that is the same as the bank page number extracted at step 504, then the method returns to step 518. Again, if at step 518, the count reflected by the interlock counter 418 equals zero, then the controller logic 422 has processed all the read and write commands associated with the currently activated bank page and the method 500 returns to step 502.

Figure 6A:
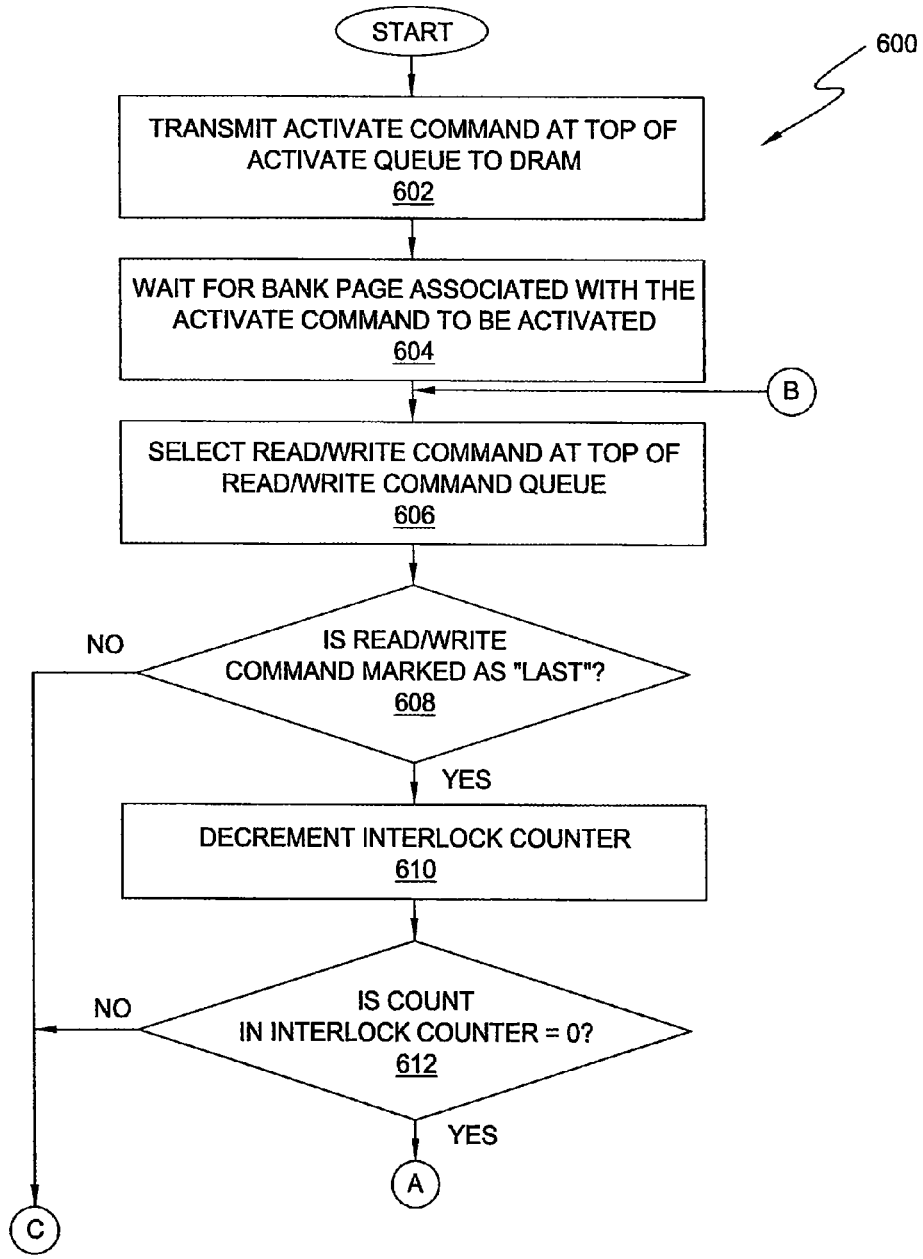
FIGS. 6A and 6B set forth a flow diagram of method steps for transmitting read and write commands from the read/write command queue of FIG. 4 to an associated bank page, according to one embodiment of the present invention.
Figure 6B:
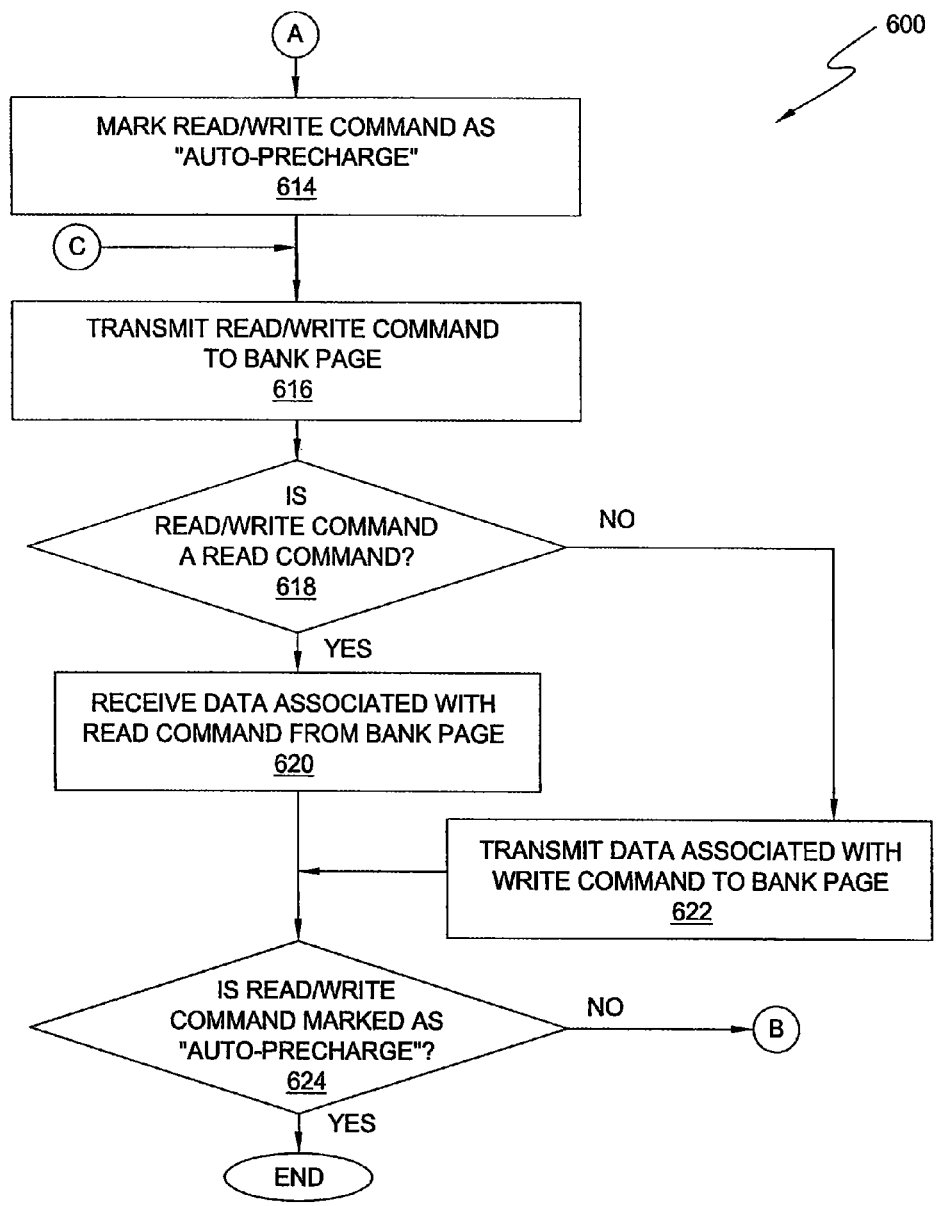

FIGS. 6A and 6B set forth a flow diagram of method steps for transmitting read and write commands from the read/write command queue 416 of FIG. 4 to an associated bank page, according to one embodiment of the present invention. Although the method steps are described in conjunction with the systems for FIGS. 1-4, persons skilled in the art will understand that any system configured to perform the method steps, in any order, is within the scope of the invention.

The method 600 begins at step 602 where the controller logic 422 retrieves the activate command positioned at the top of the activate command queue 414 and transmits that activate command to the DRAM 220 for processing. Upon receiving the activate command, the DRAM 220 activates the bank page associated with the bank page number included in the activate command. At step 604, because the activation of the bank page takes a pre-determined number of clock cycles, the controller logic 422 waits the pre-determined number of clock cycles before transmitting read and write commands to that bank page for processing. At step 606, the controller logic 422 selects the read or write command positioned at the top of the read/write command queue 416 for further processing.

At step 608, the controller logic 422 determines whether the selected command is marked as "last." If the selected command is marked as "last," then the method 600 proceeds to step 610. Again, a command marked as "last" indicates the last command in a set of read and write commands received from the sort bin affirmatively associated with the currently activated bank page. At step 610, the controller logic 422 decrements the interlock counter indicating that a "last" command is being processed. At step 612, the controller logic 422 determines whether the count reflected by the interlock counter 418 is zero. If the count reflected by the interlock counter 418 is zero, then, at step 614, the controller logic 422 marks the selected command as "auto-precharge." When the interlock counter 418 is zero, the selected command is the last command associated with the currently activated bank page that is stored in the read/write command queue 416. As described in conjunction with FIG. 4, marking a command as "auto-precharge" causes the DRAM 220 to close the currently activated bank page after that command has been processed. New read and write commands associated with the currently activated bank page received after the selected command is marked as "auto-precharge" cannot be processed in the current bank page activation window. However, if, at step 612, the count reflected by the interlock counter 418 is greater than zero, then the method 600 proceeds directly to step 616. The positive count reflected by the interlock counter 418 indicates the presence of more read or write commands in the read/write command queue 416 that are associated with the currently activated bank page. The controller logic 422 does not mark the selected command an "auto-precharge" command and the currently activated bank page remains activated for more read and write commands.

At step 616, the controller logic 422 transmits the selected command to the currently activated bank page for further processing. At step 618, the controller logic 422 determines whether the selected command is a read command. If the selected command is a read command, then, at step 620, the read data buffer 426 receives the data associated with the read command from the currently activated bank page. The method 600 then proceeds to step 624. If, at step 618, the selected command is a write command, then, at step 622, the data associated with the write command is transmitted from the write data buffer 430 to the currently activated bank page for storage. At step 624, if the selected command was marked as "auto-precharge," at step 614, then the method 600 terminates. However, if the selected command was not marked as "auto-precharge," then the method 600 returns to step 606, previously described herein, where a new command is selected by the controller logic 422 for processing.

Referring back to step 608, if the selected command is not marked as "last," then the method 600 proceeds directly to step 616, previously described herein.

In sum, read and write commands associated with a particular bank page are stored in a sort bin in a command sorter. Each sort bin in the command sorter may be affirmatively associated with a different bank page in the DRAM. An arbiter unit determines which read and write commands stored in the command sorter should be processed. The arbiter unit works in conjunction with the DRAM controller to activate bank pages, transmit read or write commands associated with those bank pages and close activated bank pages.

The arbiter unit retrieves read and write commands associated with a particular bank page corresponding to an entry positioned at the head of the bank queue from a related sort bin in the command sorter. The arbiter unit then causes the retrieved read and write command to be transmitted to a read/write command queue. The arbiter unit also transmits an activate command associated with that bank page to an activate command queue.

Once the read and write commands are transmitted to the read/write command queue from a sort bin, the arbiter unit marks the last read or write command stored in the read/write command queue as "last" and increments an interlock counter. The interlock counter keeps track of the number of "last" read or write commands in the read/write command queue. While the interlock counter is greater than zero, the arbiter searches the bank queue for more entries that are associated with the bank page for which the activate command was transmitted to the activate command queue. If such an entry exists in the bank queue, then the arbiter unit transmits the read and write commands from the sort bin in the command sorter associated with that entry and marks the last command in the command queue as "last." The interlock counter is then incremented.

A controller logic within the DRAM controller transmits the activate command stored in the activate queue that was transmitted by the arbiter unit to the DRAM. The controller logic waits for a pre-determined number of cycles until the bank page associated with the activate command is activated by the DRAM. Once the bank page is activated, the read and write commands that are stored in the read/write command queue are sequentially transmitted to the bank page for processing. In the case of a write command, the data associated with the write command received from the L2 cache is transmitted to the activated bank page. In the case of a read command, the data associated with the read command is received from the activated bank page and transmitted to the L2 cache.

When the controller logic encounters a read or write command in the read/write command queue that is marked as "last," the controller logic decrements the count reflected by the interlock counter. If the count reflected by the interlock counter is zero, then the DRAM controller marks the read or write command as "auto-precharge." The DRAM bank closes the activated bank page once the "auto-precharge" read or write command is processed. If the count reflected by the interlock counter is not zero, then the DRAM controller ignores the read or write command marked as "last" and continues to sequentially transmit read or write commands from the read/write command queue to the bank page for processing.

Advantageously, a bank page remains activated until there are no more read/write commands associated with that bank page stored in the command sorter. This approach maximizes the number of read/write commands that may be processed within a single activation window of a specific bank page. Further, since the bank page does not remain activated for a pre-determined time after a last read or write command is processed, as done in prior art approaches, the system is not stalled unnecessarily. In addition, marking the last command to be processed by a particular bank page as "auto-precharge" causes that bank page to automatically close so that the controller logic does not have to transmit a separate pre-charge command to close the bank page, thereby reducing the amount of traffic being transmitted over the command bus.

While the foregoing is directed to embodiments of the present invention, other and further embodiments of the invention may be devised without departing from the basic scope thereof. For example, aspects of the present invention may be implemented in hardware or software or in a combination of hardware and software. One embodiment of the invention may be implemented as a program product for use with a computer system. The program(s) of the program product define functions of the embodiments (including the methods described herein) and can be contained on a variety of computer-readable storage media. Illustrative computer-readable storage media include, but are not limited to: (i) non-writable storage media (e.g., read-only memory devices within a computer such as CD-ROM disks readable by a CD-ROM drive, flash memory, ROM chips or any type of solid-state non-volatile semiconductor memory) on which information is permanently stored; and (ii) writable storage media (e.g., floppy disks within a diskette drive or hard-disk drive or any type of solid-state random-access semiconductor memory) on which alterable information is stored. Such computer-readable storage media, when carrying computer-readable instructions that direct the functions of the present invention, are embodiments of the present invention. Therefore, the scope of the present invention is determined by the claims that follow.

We claim:

1. A computer-implemented method for processing commands associated with an activated bank page within a memory unit, the method comprising:
retrieving an activate command directly from an activate command queue, wherein the activate command is associated with a first bank page within the memory unit;
transmitting the activate command directly to the memory unit for processing;
once the first bank page is activated, selecting a first command directly from a read/write command queue;
transmitting the first command directly to the first bank page within the memory unit for processing;
decrementing a count associated with an interlock counter after determining that the first command is marked as a last command; and
marking the first command as an auto-precharge command after determining that the count associated with the interlock counter is equal to zero.

2. The method of claim 1, wherein the first command is a read command, and further comprising the step of receiving data associated with the first command from the first bank page.

3. The method of claim 1, wherein the first command is a write command, and further comprising the step of transmitting data associated with the first command to the first bank page for storage.

4. The method of claim 1, further comprising the step of waiting a pre-determined number of cycles before transmitting the first command to the first bank page to allow the first bank page to activate.

5. The method of claim 1, wherein the first bank page within the memory unit is deactivated after the first command has been processed.

6. The method of claim 1, further comprising the steps of determining that the count associated with the interlock counter is greater than zero, and further comprising the step of selecting a second command from the read/write command queue for processing after the first command has been transmitted to the first bank page within the memory unit for processing.

7. The method of claim 1, wherein the first command is not an auto-precharge command, and further comprising the step of selecting a second command from the read/write command queue for processing after the first command has been transmitted to the first bank page within the memory unit for processing.

8. A memory controller resident in frame buffer logic that is coupled to an intermediary cache and to an external memory unit, the memory controller configured to process commands that are received from the intermediary cache and associated with an activated bank page within the external memory unit, by performing the steps of:
   retrieving an activate command directly from an activate command queue, wherein the activate command is associated with a first bank page within the memory unit;
   transmitting the activate command directly to the memory unit for processing
   once the first bank page is activated, selecting a first command directly from a read/write command queue;
   transmitting the first command directly to the first bank page within the memory unit for processing;
   decrementing a count associated with an interlock counter after determining that the first command is marked as a last command; and
   marking the first command as an auto-precharge command after determining that the count associated with the interlock counter is equal to zero.

9. The memory controller of claim 8, wherein the first command is a read command, and further comprising the step of receiving data associated with the first command from the first bank page.

10. The memory controller of claim 8, wherein the first command is a write command, and further comprising the step of transmitting data associated with the first command to the first bank page for storage.

11. The memory controller of claim 8, further comprising the step of waiting a pre-determined number of cycles before transmitting the first command to the first bank page to allow the first bank page to activate.

12. The memory controller of claim 8, wherein the first bank page within the memory unit is deactivated after the first command has been processed.

13. The memory controller of claim 8, further comprising the steps of determining that the count associated with the interlock counter is greater than zero, and further comprising the step of selecting a second command from the read/write command queue for processing after the first command has been transmitted to the first bank page within the memory unit for processing.

14. The memory controller of claim 8, wherein the first command is not an auto-precharge command, and further comprising the step of selecting a second command from the read/write command queue for processing after the first command has been transmitted to the first bank page within the memory unit for processing.

15. A computing device, comprising:
   one or more clients;
   an intermediary cache coupled to the one or more clients via a crossbar unit and configured to process commands received from the one or more clients; and
   frame buffer logic coupled to the intermediary cache and to an external memory unit and including a memory controller that is configured to process commands that are received from the intermediary cache and associated with an activated bank page within the external memory unit, by performing the steps of:
      retrieving an activate command directly from an activate command queue, wherein the activate command is associated with a first bank page within the memory unit,
      transmitting the activate command directly to the memory unit for processing,
      once the first bank page is activated, selecting a first command directly from a read/write command queue,
      transmitting the first command directly to the first bank page within the memory unit for processing,
      decrementing a count associated with an interlock counter after determining that the first command is marked as a last command, and
      marking the first command as an auto-precharge command after determining that the count associated with the interlock counter is equal to zero.

16. The computing device of claim 15, wherein the memory controller is further configured to determine that the count associated with the interlock counter is greater than zero, and to select a second command from the read/write command queue for processing after the first command has been transmitted to the first bank page within the memory unit for processing.

17. The computing device of claim 15, wherein the first command is not an auto-precharge command, and the memory controller is further configured to select a second command from the read/write command queue for processing after the first command has been transmitted to the first bank page within the memory unit for processing.

18. The computing device of claim 15, wherein the memory controller is further configured to process commands by performing the step of waiting a pre-determined number of cycles before transmitting the first command to the first bank page to allow the first bank page to activate.

* * * * *